March 19, 1963  R. NISTRI  3,081,668
APPARATUS CONTAINING A PLURALITY OF SOUND MOVING
PICTURE FILMS WITH A DEVICE FOR THE PROJECTION
OF THE FILM CHOSEN
Filed Oct. 12, 1959  3 Sheets-Sheet 1
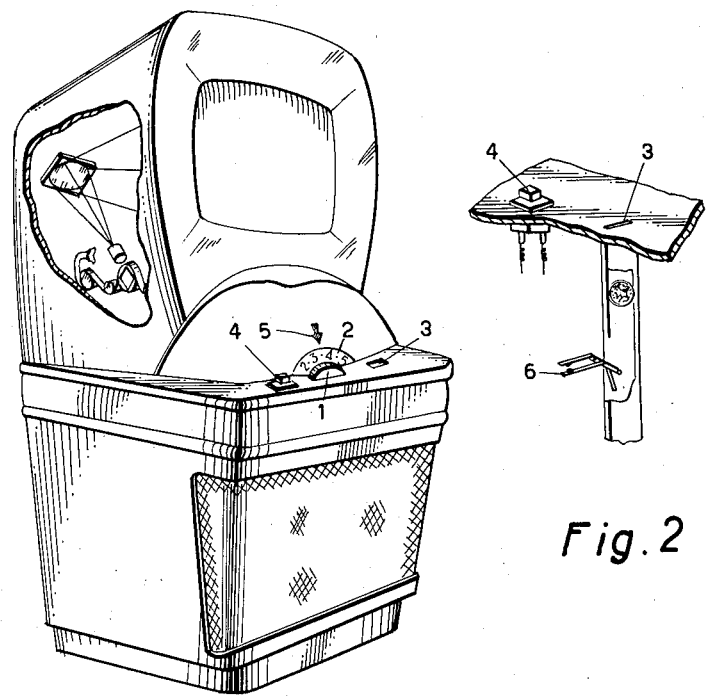
Fig.1
Fig.2
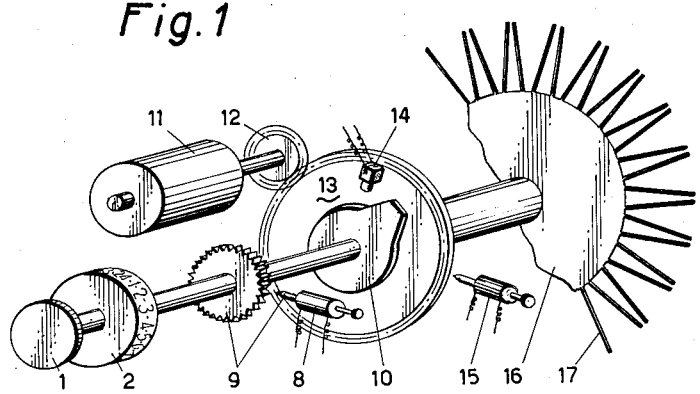
Fig.3
INVENTOR.
R. Nistri
BY Richards & Geier
ATTORNEYS March 19, 1963

R. NISTRI 3,081,668

APPARATUS CONTAINING A PLURALITY OF SOUND MOVING
PICTURE FILMS WITH A DEVICE FOR THE PROJECTION
OF THE FILM CHOSEN

Filed Oct. 12, 1959

INVENTOR.
R. Nistri
BY Richards & Geier
ATTORNEYS

United States Patent Office 3,081,668
Patented Mar. 19, 1963

3,081,668
APPARATUS CONTAINING A PLURALITY OF SOUND MOVING PICTURE FILMS WITH A DEVICE FOR THE PROJECTION OF THE FILM CHOSEN
Raffaello Nistri, Rome, Italy, assignor to Societa Internazionale Fonovisione-S.I.F., Rome, Italy
Filed Oct. 12, 1959, Ser. No. 845,985
Claims priority, application Italy Mar. 21, 1959
3 Claims. (Cl. 88—16.2)

The present invention can be considered as an improvement to the so-called "juke boxes" which have rapidly become very popular throughout the world. The improvement lies in the fact that the apparatus forming the object of the invention, in addition to playing a record of a scene, orchestra piece, chorus, recital, scene or the like, produces a visual image appearing on a suitable screen fitted to the cabinet containing the device.

The apparatus intended to achieve this result comprises a suitable cabinet carrying in the upper section a screen similar to that of television receivers and containing all mechanisms required for the operation of the machine, and more specifically: automatic coin or slug and push-button operated organs which set the machine into action; means for the selection of the film reel to be projected, comprising a drum on which are fitted radially forks which embrace all movie film reels loaded into the apparatus and means for locking in suitable position the fork corresponding to the reel of the film selected; an engagement hook fitted to the outer end of each film, operating in conjunction with a lever which makes the said hook engage a single empty reel which receives the film being projected, leading the film over the film feed devices according to the known film projection technique; a pressure device leads the film already being wound on the take-up reel into contact with the film feed organs, according to the conventional film projection technique; means for locking and releasing the pressure device at the beginning of the projection stage and when the latter is completed with the complete transfer of the film from the feed reel to the take-up reel and the direction of rotation must be reversed to rewind the film on the feed reel; mechanical, electrical and optical means actuated by relays automatically actuated by levers and rollers acting upon a film roll wound on the reels; devices for the positioning of the drum carrying the film-holding forks; safety means against the possible breakage of the film; means for lighting the cabinet in general, and the numbered drum in particular.

The detailed description of the invention will be more easily followed by referring to the drawings which represent, as a non-limiting example, one preferred embodiment thereof.

In the tables:

FIG. 1 is a perspective view, in partial cross-section, of the cabinet containing the apparatus;

FIG. 2 is a detailed view, of the part of the cabinet in which are located the slot for the introduction of the coins or slugs and the push button used to start the apparatus;

FIG. 3 is a simplified perspective view of the shaft on which is affixed the drum carrying in radial array the reel-holder forks, the same shaft carrying the devices for the actuation and locking of the film projection selector;

Figure 7A:
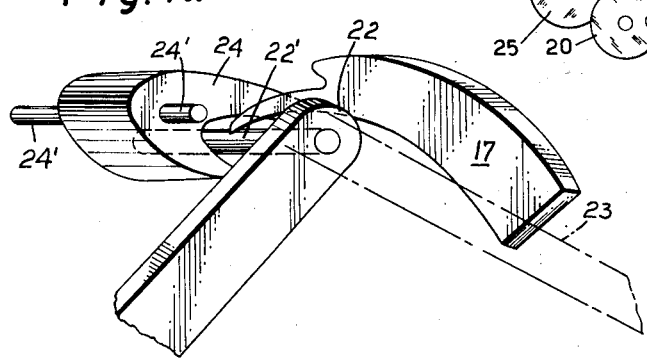
FIG. 7a is a partial perspective view illustrating the movement of the reel-engaging hook.
Figure 7:
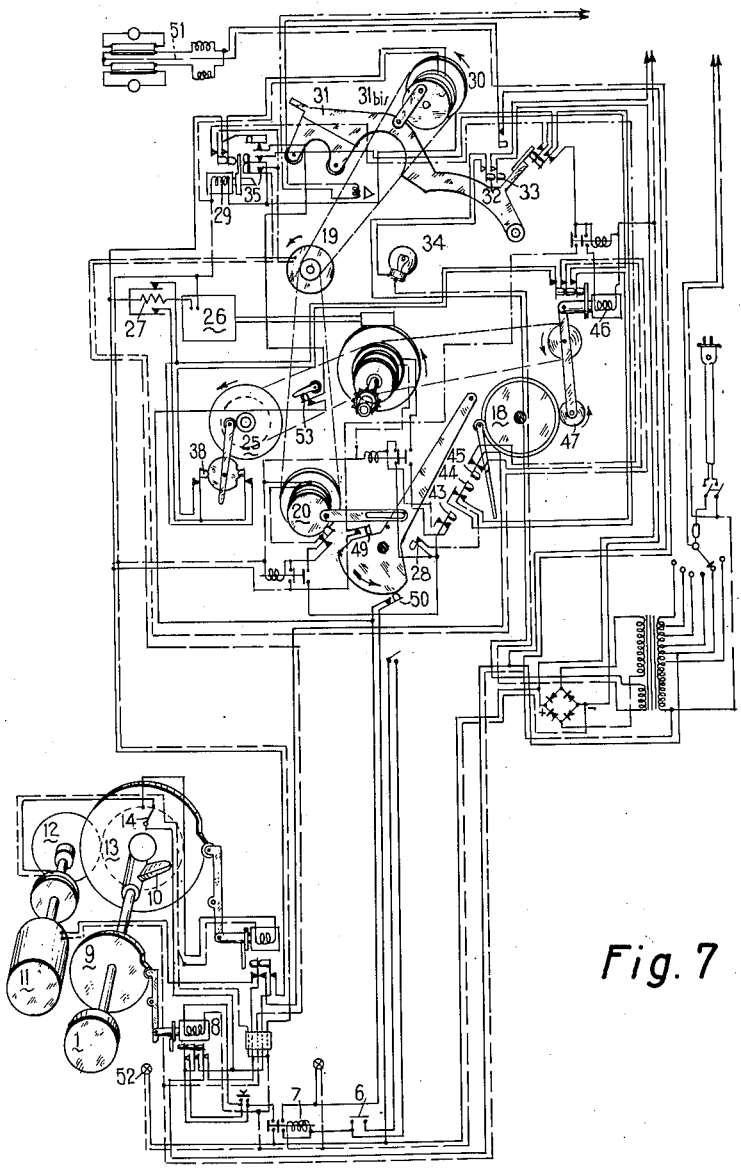
FIG. 7 is a partial perspective view of the apparatus showing the electric circuits.

With reference to the figures, on the cabinet illustrated for purposes of exemplification in FIGURE 1 the following parts are shown: a knob 1 for selecting the desired film; a numbered disc 2; a coin or slug slot 3; a push button 4 serving to start the selection and projection operations as illustrated below:

Having dialed the number of the desired film by rotating the knob 1 until the said number coincides with the pointer 5, the coin or slug is introduced into the slot 3 of a coin or slug actuator of known type which, when the coin or slug is dropped into the slot, sends through contact 6 (FIG. 7) an electrical pulse to relay 7, which energizes the circuit controlled by push button 4 (FIGS. 2 and 7). When button 4 is depressed, a current is sent into solenoid 8 (FIGS. 3 and 7) which, by means of the positioner 9, locks the knob on the selected position.

Fastened to positioner 9 is cam 10 (FIG. 3) which, as a result of the rotation manually imparted on knob 1, offers its projecting tooth to a given angular position corresponding to the position of the projection of the selected film.

Figure 4:
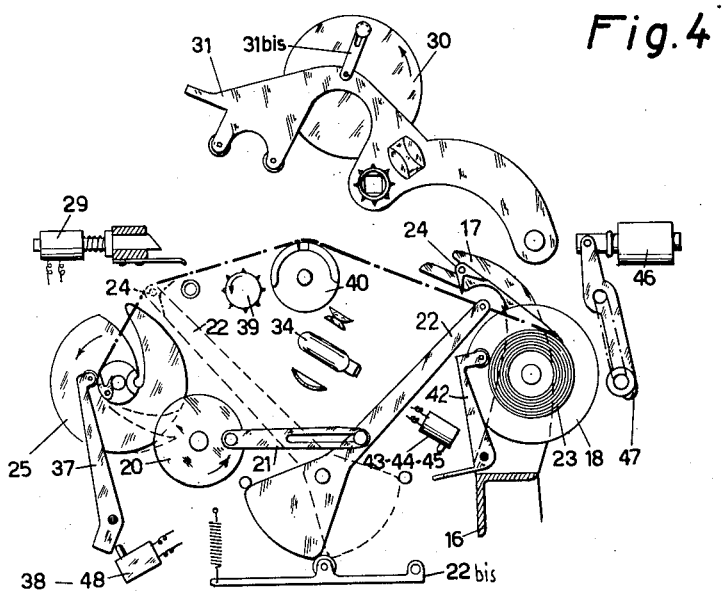
FIG. 4 is a simplified general view of the devices which ensure the engagement of the film from the position in which it lies when positioned in alignment with the take-up reel to the position which it assumes to become hooked onto the same reel.

Solenoid 8, when excited, energizes also motor 11 which, by means of gear wheel 12, drives into rotation wheel 13, on which is fastened switch 14 which, actuated by the projection of cam 10, turns off the power from motor 11 and energizes solenoid 15. When energized, the latter locks wheel 13 and with it drum 16, which is fastened to the same shaft to which is fastened gear 13. Drum 16 carries, arranged radially, a plurality of forks 17, on each of which is mounted a film reel 18 (FIGS. 3 and 4).

When excited, solenoid 15 (FIG. 3) feeds current into motor 19 (FIG. 7) which, by suitable electrical and mechanical devices of known type, makes flywheel 20 rotate by one turn. In the first 180 degrees of this rotation flywheel 20 (FIG. 4) actuates connecting rod 21 which moves arm 22 to the position shown in broken lines, in which position the arm is retained by positioner 22bis.

On reel 18 is wound film 23, to whose free external end is fastened a hook 24 of suitable shape, such that it can remain in the rest position, fitting into a suitable recess on the end of fork 17. In this condition the hook offers itself to the end of arm 22 so that the latter, in its rotation, moves the hook to the position shown in broken lines in FIG. 4, moving the film to the position also shown in broken lines.

As flywheel 20 revolves, the take-up reel 25 begins to rotate, driven by motor 26 (FIG. 7). This reel rotates at a reduced speed because of the action of speed limiter 27, and it is shaped to engage hook 24 with its core, on which the film is wound.

Figure 5:
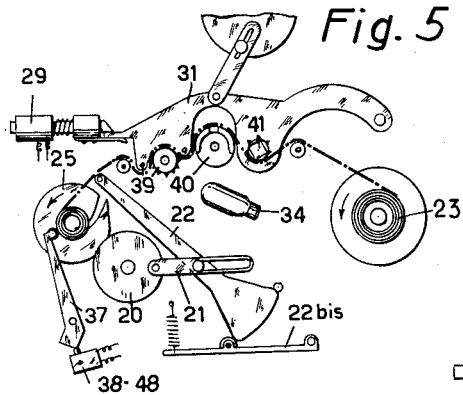
FIG. 5 is the same mechanism illustrated in FIG. 4, when the film is unwound from the feed reel to the take-up reel.
Figure 6:
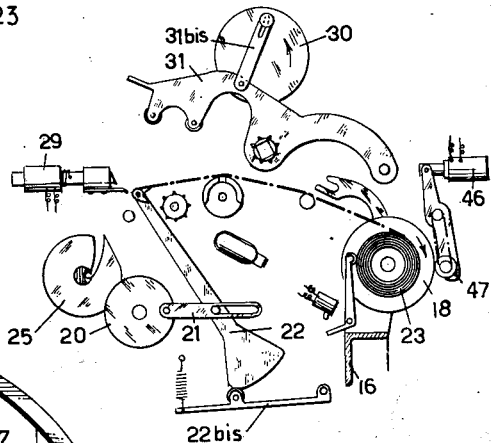
FIG. 6 represents the same mechanism when, after the film is rewound on the feel, its end fastening is released.

At the end of its travel, arm 22 closes contact 28 (FIG. 7) which, by energizing solenoid 29 (FIG. 4), closes appropriate circuits which make motor 19 rotate flywheel 30. Consequently, the pressure device 31, by means of connecting rod 31bis, drops to the position shown in FIG. 5, thus correctly positioning the film and rendering the apparatus ready for projecting the film.

When reaching this position, pressure device 31 closes contacts 32 and 33 (FIG. 7), thereby energizing projection lamp 34 and the sound amplifier. At the same time, by opening contacts 35 and 36, it de-energizes solenoid 29 which, by retracting, locks the pressure device and turns off motor 19 (FIGS. 4 and 7).

In designing the apparatus, the timing of these operations is set so that at this point sufficient turns of film have already been wound on the take-up reel 25 to effect, through pressure lever 37 and contact 38, the exclusion of the speed limiter 27, thereby allowing motor 26 to run up to projection speed.

The projection of the film is thus accomplished by the rotation of capstan reel 39, of the magnetic sound track reader 40 and of the optical projector 41 (FIG. 5), which will be preferably of the Moviola type.

At the end of the film, the pressure lever 42 (FIG. 42) will assume a position actuating contacts 43, 44 and 45 which perform the following operations:

Stopping the movement of the film over reel 39;
Exciting solenoid 29;
Causing the re-engagement of motor 19 with flywheel 30, and consequently the lifting of pressure device 31;
De-energising the projection lamp and the sound amplifier;
Exciting solenoid 46, which moves roller 47 into contact with the flanges of the feed reel 18. This roller is actuated by motor 26 and drives reel 18, which thus begins rewinding the film.

When a certain number of turns are left on the take-up reel 25, the pressure lever 37 (FIG. 7), by means of contact 48, re-engages the speed reducer 27, thus lowering the film rewinding speed to a level considered suited to the operations which follow.

When the film is completely unwound from reel 25, it again offers its hook end 24 to a position where it can engage arm 22, and pulls it back to the position of rest shown in full lines in FIG. 4; at the end of the return travel, hook 24 will resume its position on fork 17, while arm 22 opens contact 49 and closes contact 50 (FIG. 7).

FIG. 7a shows in perspective hook 24 and arm 22 in a position subsequent to that it has in FIG. 4, in solid lines. Under these conditions (FIG. 4), when arm 22 is moved by connecting rod 21 angularly to the left, passing alongside hook 24, which is mounted by means of extensions 24' on the fixed fork 17, it removes it from the fork by means of pin 22' and moves it into engagement with its extensions within the slot in reel 25 which, rotating in the direction shown by the arrow appearing in FIG. 4, moves it along the helical slot in the reel to the center thereof, causing the film to be wound. During this winding process arm 22 remains in the position shown in dotted lines in FIG. 4, waiting for the moment when the film, on completion of projection, has unwound from reel 25. At this point hook 24, released from reel 25, again engages pin 22' and moves arm 22 back to the position shown in solid lines in FIG. 4. Passing underneath the end of fork 17, the left and right extensions 24' of hook 24 stop the hook on the said fork.

The opening of contact 49 de-energizes solenoid 46 which moves roller 47 off reel 18. The closing of contact 50 energizes ratchet relay 7, which de-energizes solenoid 8, solenoid 15 and consequently motor 26.

In these conditions, the apparatus is ready to start a new cycle.

In this description, the general cabinet lighting system 51, the lamp 52 lighting the numbered film-selecting drum and the device 53 for stopping the machine in the event of the film breaking while being projected (such as a suitable micro switch) are merely outlined in FIG. 7, since they are known and not claimed applications.

Since the invention is described herein as a non-limiting example, and persons experienced in this particular branch can introduce changes in the individual devices through which the invention is realised, it is understood that all modifications and variations which incorporate the same inventive principles and tend to the same results, fall within the scope of the present invention, as delimited by the following claims.

What I claim is:

1. A coin operated sound movie film projection apparatus, comprising a cabinet, a screen located above said cabinet, a drum located within said cabinet, a plurality of radial film-carrying forks carried by said drum, a shaft supporting said drum, said drum being rotatably mounted upon said shaft, a film-numbered disc keyed upon said shaft and having a portion projecting outside of said cabinet for rotating said shaft to a selected position for selecting one of said films for playing, a positioning gear wheel keyed upon said shaft, another gear wheel firmly connected with said drum, a switch carried by the second-mentioned gear wheel, a cam keyed upon said shaft and adapted to engage said switch, coin-operated means for locking the first-mentioned gear wheel in a selected position corresponding to the position of said film-numbered disc, indexing means connected with the coin-operated means for turning the second-mentioned gear wheel along with said drum to the selected position, locking means connected with said switch and actuated thereby for locking the second-mentioned gear wheel along with said drum in said selected position, a separate hook connected with each of the films carried by said forks, said hooks being carried by said holder, a film winding reel, a swingable arm adapted to engage the hook of the selected film and move it upon said winding reel to extend the selected film, means connected with the locking means for actuating said swingable arm and said winding reel, film pressing means actuated by said swingable arm for moving the extended selected film to a projecting position, a projector actuated by the film-pressing means for projecting the selected film located in a projecting position upon said screen, and rewind means engaging the selected film for rewinding it upon said holder upon the completion of the projection of said film.

2. A coin operated sound movie film projection apparatus, comprising a cabinet, a screen located above said cabinet, a drum located within said cabinet, a plurality of radial film-carrying forks carried by said drum, manually positionable selector means located within said cabinet and extending outside of said cabinet for selecting one of said films for playing, coin-operated means for locking the selector means in the selected position, indexing means connected with the coin-operated means for turning said drum to the selected position, a separate hook connected with each of the films carried by said forks, said hooks being carried by said holder, a film winding reel, a swingable arm adapted to engage the hook of the selected film and move it upon said winding reel to extend the selected film, said arm having an angular extension, a connecting rod connected with said angular extension and actuating said arm, a sound-reading reel, a feed reel, said film when extended engaging said sound-reading reel and said feed reel, a speed limiter connected with said winding reel, means connected with said connecting rod, said speed limiter and the indexing means for actuating said swingable arm and said winding reel, a film pressure device, a motor, means connected with said film pressure device and said motor and actuated by said arm for causing said film pressure device to engage the stretched selected film and press it against said sound-reading reel and said feed reel, a projector for projecting the selected film upon said screen, and rewind means engaging the selected film for rewinding it upon said holder upon the completion of the projection of said film.

3. A coin operated sound movie film projection apparatus, comprising a cabinet, a screen located above said cabinet, a drum located within said cabinet, a plurality of radial film-carrying forks carried by said drum, manually positionable selector means located within said cabinet and extending outside of said cabinet for selecting one of said films for playing, coin-operated means for locking the selector means in the selected position, indexing means connected with the coin-operated means for turning said drum to the selected position, a separate hook connected with each of the films carried by said forks, said hooks being carried by said holder, a film winding reel, a swingable arm adapted to engage the hook of the selected film and move it upon said winding reel to extend the selected film, means connected with the indexing means for actuating said swingable arm and said winding reel, film pressing means actuated by said swingable arm for moving the extended selected film to a projecting position, a projector actuated by the film pressing means for projecting the selected film located in a projecting position upon said screen, a roller engaging the selected film as it is being unwound, a lever arm carrying said roller, contacts connected with the last-mentioned arm, and rewind means connected with said contacts and actuating said swingable arm means and operable after the selected film is unwound for rewinding said film, returning said hook to a fork, moving the film pressing means out of engagement with said film and switching off said projector.

References Cited in the file of this patent

UNITED STATES PATENTS

| | | |
|---|---|---|
| 2,180,639 | McMahon et al. | Nov. 21, 1939 |
| 2,290,071 | Rinaldy | July 14, 1942 |
| 2,345,869 | Edwards | Apr. 4, 1944 |